(12) United States Patent
Zuber et al.

(10) Patent No.: US 6,441,573 B1
(45) Date of Patent: Aug. 27, 2002

(54) BLENDED ELECTRICAL/FRICTION BRAKING SYSTEM WITH ELECTRIC BRAKE FEEDBACK MONITOR AND METHOD OF USE THEREOF

(75) Inventors: Pierre A. Zuber, Bethel Park; Richard P. Ames, Jefferson Hills; Nikola V. Langovsky, Clairton; William E. Madden, Jr., Pittsburgh; Steven T H Chang, Export; Robert W. Phillips, Jefferson Hills; Theresa A. Barbour, Monroeville, all of PA (US)

(73) Assignee: DaimlerCrysler AG (DE)

( * ) Notice: Subject to any disclaimer, the term of this patent is extended or adjusted under 35 U.S.C. 154(b) by 0 days.

(21) Appl. No.: 09/560,493

(22) Filed: Apr. 28, 2000

(51) Int. Cl.[7] .............................. H02P 3/12; H02P 3/14; H02P 3/18; H02P 3/00
(52) U.S. Cl. ...................... 318/375; 318/273; 318/370; 318/372; 318/759; 318/612; 318/614
(58) Field of Search .................. 318/611–612, 614–617, 318/87–88, 757, 759, 273, 362, 370–372, 375–376

(56) References Cited

U.S. PATENT DOCUMENTS

| | | | |
|---|---|---|---|
| 4,093,900 A | * 6/1978 | Plunkett | 318/370 |
| 4,300,082 A | * 11/1981 | Angersbach et al. | 318/614 |
| 4,651,071 A | 3/1987 | Imanaka | 318/371 |
| 4,659,149 A | 4/1987 | Rumsey et al. | 303/3 |
| 4,692,867 A | 9/1987 | Poole | 364/426 |
| 4,835,693 A | 5/1989 | Smith et al. | 364/426.01 |
| 5,064,251 A | 11/1991 | Romansky | 303/3 |
| 5,315,520 A | 5/1994 | Drake et al. | 364/426.05 |
| 5,449,049 A | 9/1995 | Every | 180/197 |
| 5,496,096 A | 3/1996 | Petersen et al. | 303/3 |
| 5,511,859 A | 4/1996 | Kade et al. | 303/3 |
| 5,713,639 A | 2/1998 | Doto et al. | 303/3 |
| 5,803,554 A | 9/1998 | Maruta et al. | 303/3 |
| 5,839,800 A | * 11/1998 | Koga et al. | 318/376 |
| 5,895,100 A | 4/1999 | Ito et al. | 303/152 |
| 5,951,115 A | 9/1999 | Sakai et al. | 303/3 |
| 6,158,822 A | * 12/2000 | Shirai et al. | 318/362 |

* cited by examiner

Primary Examiner—Marlon T. Fletcher
(74) Attorney, Agent, or Firm—Webb Ziesenheim Logsdon Orkin & Hanson, P.C.

(57) ABSTRACT

A blended electrical/friction braking system includes an electric brake feedback monitor which monitors a first signal corresponding to an electric brake effort request of an electric motor of an electrically powered vehicle. The electric brake feedback monitor detects one or more electrical conditions of the electric motor during electric braking and selectively supplies/terminates the first signal to/from a brake controller as a function of the first signal and the one or more electrical conditions. In response to termination of the first signal thereat, the brake controller causes a friction brake of the vehicle to assume the entire braking effort of the vehicle.

12 Claims, 3 Drawing Sheets

BLENDED ELECTRICAL/FRICTION BRAKING SYSTEM WITH ELECTRIC BRAKE FEEDBACK MONITOR AND METHOD OF USE THEREOF

BACKGROUND OF THE INVENTION

1. Field of the Invention

The present invention relates to a blended electrical/friction braking system of an electric motor powered vehicle and, more particularly, to a system which monitors a regenerative/dynamic braking effort of the electric motor and which operates the friction brake of the vehicle as a function thereof.

2. Background Art

An electrically powered vehicle, such as an electrically powered mass transit vehicle, typically includes an AC or DC electric motor for propelling the vehicle along a path or running rails. During acceleration or constant speed operation of the vehicle, electrical power is controllably supplied to the electric motor. When it is desired to brake the vehicle, the momentum of the vehicle can be utilized to drive the electric motor as a generator for generating electric power which is supplied for use by other electrical/electronic devices and/or for storage in a storage device, such as a battery or capacitor, or for dissipation by a suitable load. The use of the electric motor as a generator to convert the momentum of the vehicle into electric power for such use and/or storage is commonly known as regenerative braking. The use of the electric motor as a generator to convert the momentum of the vehicle into electric power for dissipation by a load is commonly known as dynamic braking. Hereinafter, phrases such as "electrical braking", "electric braking", "electrically braking", "electrically brake" and the like, are utilized to refer to driving the "electric motor in a dynamic braking mode and/or a regenerative braking mode.

Such a vehicle would also include a friction brake which is utilized in a blended manner with the electric motor to brake the wheels of the vehicle in a manner known in the art. In operation, the electric motor is utilized for electrically braking the vehicle at higher speeds where the electric motor can be used more effectively and the friction brake is utilized to brake the vehicle at lower speeds where the electric motor is less effective. Blended electrical/friction braking systems are well-known in the art.

A problem with such blended electrical/friction braking systems, however, is that if the actual extent of electric braking does not correspond to the requested/expected extent of electric braking, no mechanism exists for detecting this lack of correspondence and for causing the friction braking to assume the overall braking effort of the vehicle.

It is, therefore, an object of the present invention to provide a blended electrical/friction braking system having a brake feedback monitor for monitoring a difference between a requested electric braking effort of an electric motor of a vehicle and the actual electric braking effort of the motor and for causing a friction brake of the vehicle to assume the entire braking effort if the difference exceeds a predetermined difference. Still other objects of the present invention will become apparent to those of ordinary skill in the art upon reading and understanding the following detailed description.

SUMMARY OF THE INVENTION

Accordingly, we have invented a blended electrical/friction braking system for use in a vehicle having an electric motor which can be operated to electrically brake one or more wheels of the vehicle and a friction brake for friction braking one or more wheels of the vehicle. The braking system includes a brake controller for monitoring a brake effort request and for allotting the brake effort request between a first brake effort request corresponding to a desired amount of electrical braking effort to be supplied by the electric motor during electric braking and a second brake effort request corresponding to a desired amount of friction braking effort to be supplied by the friction brake. A drive control unit produces from the first brake effort request a first signal corresponding thereto and supplies the first signal to the brake controller. One or more sensors sense one or more electrical conditions of the electric motor during electrical braking. A brake feedback monitor monitors the first signal, converts the one or more sensed electrical conditions into a second signal corresponding thereto, compares the first signal and the second signal and terminates receipt of the first signal by the brake controller in response to a difference between the first signal and the second signal exceeding a predetermined difference. The brake controller responds to the termination of the first signal thereat by allotting the incoming brake effort request entirely to the second brake effort request. The one or more sensed electrical conditions of the electric motor can include voltage(s), current(s) and/or phase angle(s) therebetween.

The brake feedback monitor can include a processor and a relay connected to the processor to be controlled thereby. The relay has a contact in a path of the first signal between the drive control unit and the brake controller. The processor controls the contact so that (i) the brake controller receives the first signal when the difference between the first signal and the second signal does not exceed the predetermined difference and (ii) the brake controller does not receive the first signal when the difference between the first signal and the second signal exceeds the predetermined difference.

The brake feedback monitor can also include a pair of relays connected in series in the path of the first signal between the drive control unit and the brake controller and a pair of processors each connected to control the contacts of the pair of relays and connected to sense the first signal on the path between the pair of relays and the brake controller. One processor determines the second signal from the one or more sensed electrical condition and supplies the second signal to the other processor. Each processor can determine whether the difference between the first signal and the second signal exceeds the predetermined difference. In response to determining the difference exceeds the predetermined difference, each processor can signal one relay to change state thereby terminating receipt of the first signal by the brake controller.

Each relay can include a status output connected to one of the processors for supplying thereto an indication of the state of the contact of the relay. Each processor can signal the other relay to change state if the status output of the one relay does not indicate that the one relay is in a state that terminates receipt of the first signal by the brake controller. Moreover, each processor, in response to detecting the first signal after signaling the one relay to change state, can signal the other relay to change state. Preferably, the first and/or second signals are pulse width modulated signals.

We have also invented a brake feedback monitor for monitoring a first signal corresponding to an electric brake effort request of an electric motor of an electrically powered vehicle, for monitoring one or more electrical conditions of the electric motor in response to the electric brake effort request, and for selectively supplying/terminating the first signal to/from a brake controller as a function of the first signal and the one or more electrical conditions.

The brake feedback monitor can include a first relay having a contact in series with a path of the first signal and a first control input for receiving a first control signal which controls the state of the first relay contact. A first processor can be connected to monitor the first signal and to monitor the one or more electrical conditions. The first processor can convert the monitored one or more electrical conditions into a second signal and can determine if a difference between the first signal and the second signal exceeds a predetermined difference. The first processor can also supply the first control signal to the first relay for causing the first relay contact to assume one state when the difference does not exceed the predetermined difference and for causing the first relay contact to assume another state when the difference exceeds the predetermined difference.

The brake feedback monitor can also include a second relay having a contact in series with the path of the first signal and a first control input for receiving a second control signal which controls the state of the second relay contact. A second processor can be connected for monitoring the first signal and for receiving the second signal from the first processor. The second processor can also determine if a difference between the first signal and the second signal exceeds a predetermined difference. The second processor can supply the second control signal for causing the second relay contact to assume one state when the difference does not exceed the predetermined difference and for causing the second relay contact to assume another state when the difference exceeds the predetermined difference. Preferably, the one state is a closed state and the other state is the opened state.

The second relay can have a second control input for receiving a third control signal which controls the state of the second relay contact. The first relay can have a second control input for receiving a fourth control signal which controls the state of the first relay contact.

In response to detecting the presence of the first signal after supplying the first control signal for causing the first relay contact to assume its opened state, the first processor can supply the third control signal to the second relay for causing the second relay contact to assume its opened state. Similarly, in response to detecting the presence of the first signal after supplying the second control signal for causing the second relay contact to assume its opened state, the second processor can supply the fourth control signal to the first relay for causing the first relay contact to assume its opened state.

Each relay can also include a status output which provides a status of the state of the contact thereof. The status output of the first relay is connected to the first processor and the status output of the second relay is connected to the second processor. After supplying the first control signal for causing the first relay contact to assume its opened state and in response to detecting via the status output of the first relay that the first relay contact is in its closed state, the first processor can supply the third control signal to the second relay for causing the second relay contact to assume its opened state. Similarly, after supplying the second control signal for causing the second relay contact to assume its opened state and in response to detecting via the status output of the second relay that the second relay contact is in its closed state, the second processor can supply the fourth control signal to the first relay for causing the first relay contact to assume its opened state.

Lastly, we have invented a method of braking an electric motor powered vehicle. The method includes allotting a brake effort request between an electric brake effort request and a friction brake effort request. The electric brake effort request is converted into a first signal which is monitored along with one or more electrical conditions of the electric motor in response to the electric brake effort request. A feedback path for the first signal is selectively opened/closed as a function of the first signal and the one or more electrical conditions. In response to opening the feedback path, the incoming brake effort request is allotted entirely to the friction brake effort request.

The step of selectively opening/closing the feedback path can include the steps of providing a pair of relays with each relay having a contact disposed in series with the feedback path and a status output which provides a status of the state of the contact thereof. One relay can be signaled to open its contact as a function of the first signal and the one or more electrical conditions. Thereafter, in response to detecting the presence of the first signal downstream in the feedback path from the one relay and/or the status output of the one relay that its contact is closed, the other relay can be signaled to open its contact.

The one or more electrical conditions can be converted into a second signal and a difference between the first signal and the second signal can be determined. The feedback path can be closed when the difference does not exceed a predetermined difference and the feedback path can be opened when the difference exceeds the predetermined difference.

DETAILED DESCRIPTION OF THE PREFERRED EMBODIMENT

Figure 1:
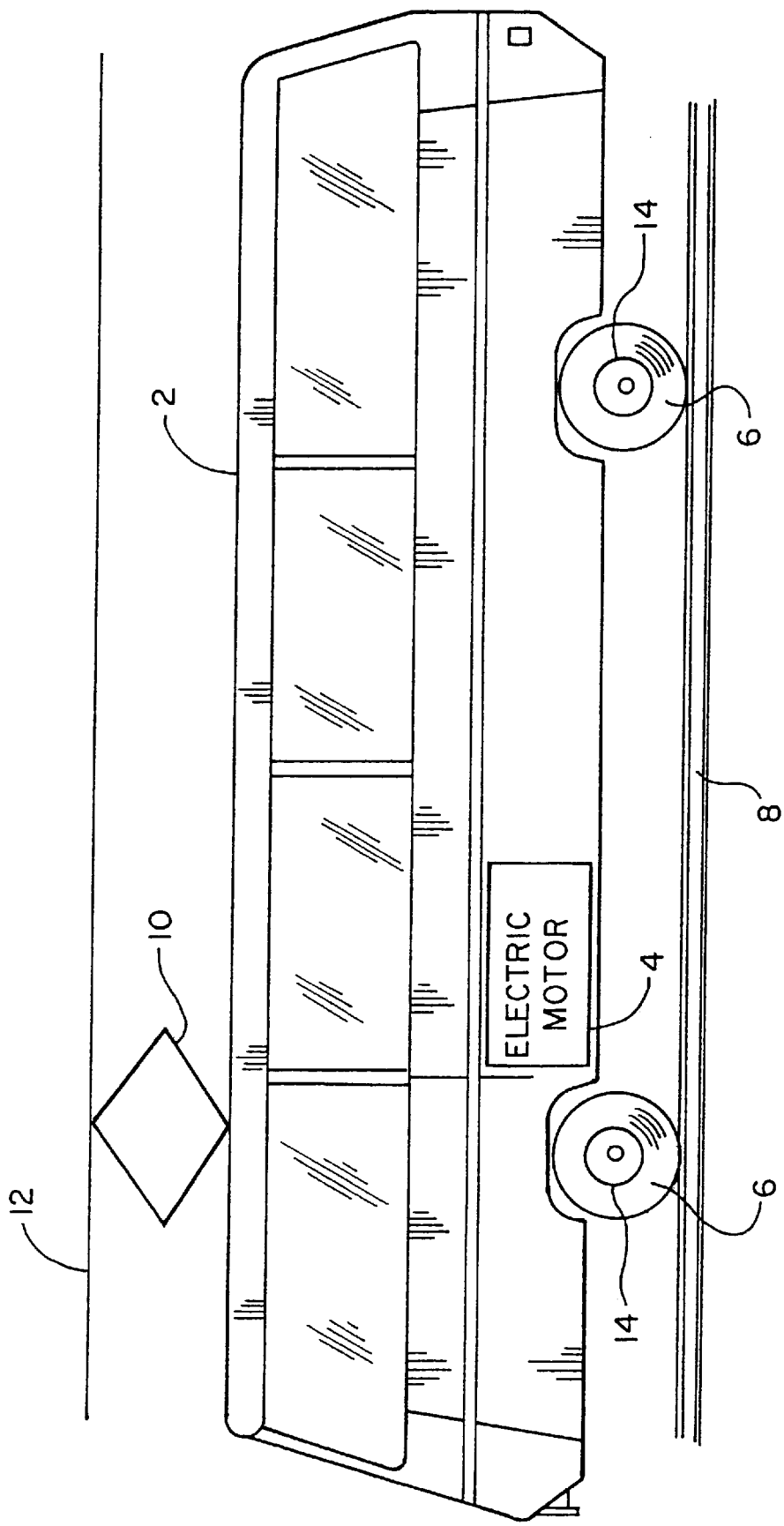
FIG. 1 is a side view of an electrically powered mass transit vehicle.

With reference to FIG. 1, a prior art electrically powered mass transit vehicle 2 includes an electric motor 4 for providing motive force to one or more wheels 6 to propel vehicle 2 along a path 8, such as a running rail. In the embodiment shown in FIG. 1, vehicle 2 includes a pantograph 10 which is utilized to conduct electric power from a supply line 12. Electric power conducted by pantograph 10 is converted to electric power by apparatus, to be hereinafter described, and provided to motor 4. Motor 4 converts the electric power provided thereto into motive force of sufficient extent to propel vehicle 2 along path 8. Alternatively, vehicle 2 can include an internal source of electric power (not shown) which supplies electric power to motor 4. If vehicle 2 includes an internal source of electric power, pantograph 10 and supply line 12 may be omitted from the embodiment shown in FIG. 1.

Figure 2A:
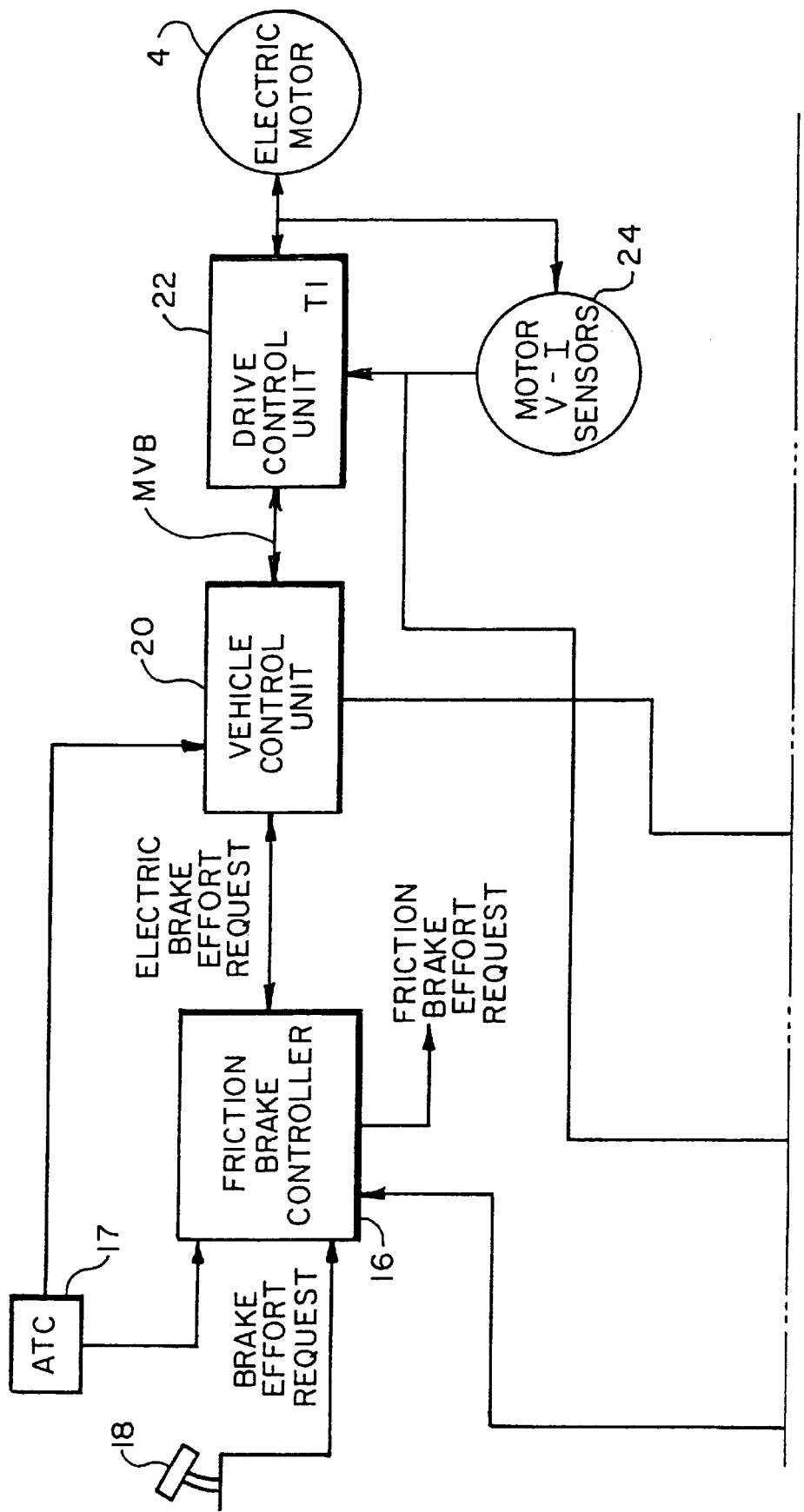
FIGS. 2a–2b are a schematic drawing of a blended electrical/friction braking system including an electric brake feedback monitor in accordance with the present invention which is included in the mass transit vehicle shown in FIG. 1.
Figure 2B:
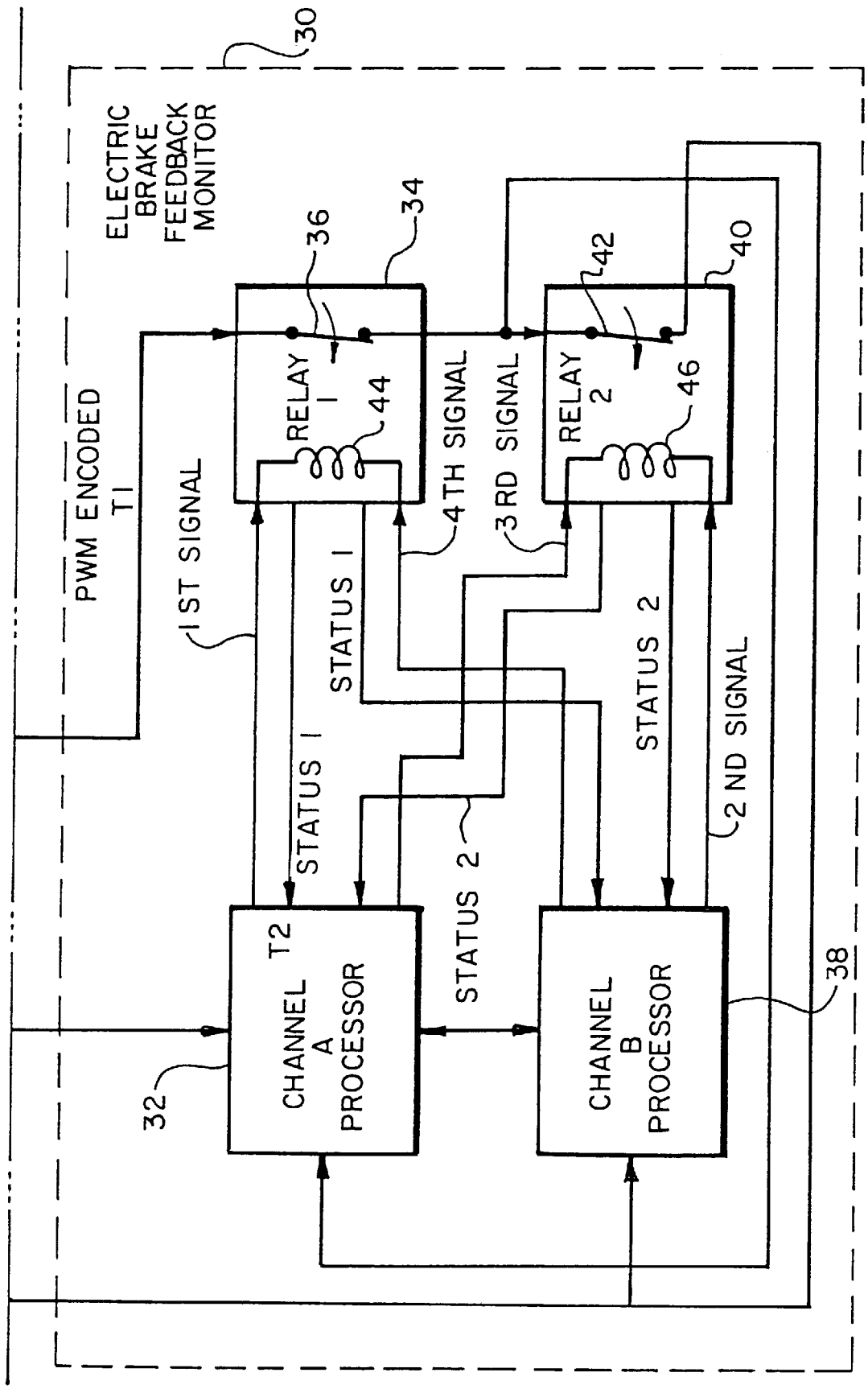

With reference to FIGS. 2a–2b, and with ongoing reference to FIG. 1, each wheel 6 includes a friction brake 14 under the control of a friction brake controller 16 connected to receive a brake effort request signal from a brake pedal 18 or, in an attendantless automated vehicle, from an automated electronic control, such as an automated train control (ATC) 17. Friction brake controller 16 allots the brake effort request between an electric brake effort request and a friction brake effort request. The combination of the electric brake effort request and the friction brake effort request correspond to the extent of the overall brake effort requested by the brake effort request. The friction brake effort request is supplied to a suitable friction brake system (not shown) which controls the application of friction brakes 14 of vehicle 2 in a manner known in the art. Such a friction brake system is well-known in the art and will not be described further herein for simplicity of discussion.

The electric brake effort request is supplied through a vehicle control unit 20 for supply to a drive control unit 22 via a multi-function vehicle bus (MVB). During acceleration or constant velocity operation of vehicle 2, drive control unit 22 supplies electric power to motor 4 in response to control signals received from vehicle control unit 20. Vehicle control unit 20 can supply control signals to drive control unit 22 as a function of an operator input to vehicle control unit 20 by an operator of vehicle 2 or, in an attendantless automated vehicle, by the ATC 17. During braking of vehicle 2 in response to receipt of the electric brake effort request from friction brake controller 16, drive control unit 22 operates motor 4 as a generator to electrically brake vehicle 2. During electrical braking, drive control unit 22 generates a first signal T1 corresponding to the electric brake effort request. First signal T1 is supplied by the drive control unit 22 to the MVB for supply in a feedback mode to friction brake controller 16 via vehicle control unit 20.

One or more motor sensors 24 are connected to sense one or more electrical conditions of motor 4. The one or more sensed electrical conditions are provided in a feedback mode to drive control unit 22 which utilizes the one or more sensed electrical conditions to control the operation of motor 4.

An electric brake feedback monitor 30 is connected in the feedback path of signal T1 between vehicle control unit 20 and friction brake controller 16 for monitoring signal T1. Electric brake feedback monitor 30 is also connected to monitor the one or more sensed electrical conditions during electric braking and to convert the one or more sensed electrical conditions into a second signal T2 corresponding thereto. During electric braking of vehicle 2, brake feedback monitor 30 compares signal T1 and signal T2 and terminates receipt of signal T1 by friction brake controller 16 in response to a difference between signal T1 and signal T2 exceeding a predetermined difference. In response to termination of signal T1 thereat, friction brake controller 16 allots the brake effort request entirely to the friction brake effort request. Hence, when the difference between signal T1, corresponding to the electric brake effort request of motor 4, and signal T2, corresponding to the actual electric braking effort of motor 4 in response to the dynamic brake effort request exceeds the predetermined difference, the entire braking effort of vehicle 2 is transferred to friction brakes 14.

Preferably, signal T1 and signal T2 are pulse width modulated signals and the one or more sensed electrical conditions includes motor voltage(s), motor current(s) and/or the phase angle(s) therebetween.

Preferably, electric brake feedback monitor 30 also includes a channel A processor 32 and a first relay 34. Relay 34 has a contact 36 in the feedback path of signal T1 between drive control unit 22 and friction brake controller 16. Channel A processor 32 is connected to receive the one or more sensed electrical conditions sensed by the one or more motor sensors 24 and is connected to the feedback path of signal T1 preferably between contact 36 and friction brake controller 16 for monitoring signal T1. Channel A processor 32 is also connected to a control input of first relay 34 for controlling the opened/closed state of contact 36.

In operation, channel A processor 32 monitors signal T1, converts the one or more sensed electrical conditions into signal T2, and compares signal T1 and signal T2. By signaling the control input of first relay 34 with a suitable first control signal, channel A processor 32 controls contact 36 so that friction brake controller 16 receives signal T1 when the difference between signal T1 and signal T2 does not exceed the predetermined difference, and the friction brake controller 16 does not receive signal T1 when the difference exceeds the predetermined difference. More specifically, when the difference does not exceed the predetermined difference, channel A processor 32 signals the control input of relay 34 with the first control signal to set or maintain contact 36 in its closed state. Similarly, when the difference exceeds the predetermined difference, channel A processor 32 signals the control input of relay 34 with the first signal to set or maintain contact 36 in its opened state.

Preferably, electric brake feedback monitor 30 also includes a channel B processor 38 and a second relay 40. Channel B processor 38 and channel A processor 32 are communicatively connected for enabling status and data to be shared therebetween. More specifically, this connection enables channel B processor 38 to receive signal T2 from channel A processor 32. Second relay 40 has a contact 42 connected in the feedback path of signal T1, preferably between contact 36 and friction brake controller 16.

Channel B processor 38 is connected to a control input of second relay 40 for controlling the opened/closed state of contact 42. Channel B processor 38 is also connected to the feedback path of signal T1 between contact 42 and friction brake controller 16 for monitoring signal T1. Since it receives signal T2 from channel A processor 32, channel B processor 38 can compare signal T1 and signal T2 without having to sense the one or more electrical conditions generated by motor 4 during electrical braking. Channel B processor 38 compares signal T1 and signal T2 and signals the control input of second relay 40 with a suitable second control signal to control the state of contact 42 so that friction brake controller 16 receives signal T1 when the difference between signal T1 and signal T2 does not exceed the predetermined difference and friction brake controller 16 does not receive signal T1 when the difference exceeds the predetermined difference. As discussed above, when friction brake controller 16 does not receive signal T1, friction brake controller 16 allots the brake effort request entirely to the friction brake effort request.

Preferably, channel A processor 32 and channel B processor 38 are also connected to another control input of second relay 40 and to another control input of first relay 34 for controlling the state of contacts 42 and 36, respectively. This cross connection of channel A processor 32 to another control input of second relay 40 enables channel A processor 32 to open contact 42 if channel A processor 32 detects signal T1 after signaling first relay 34 to open contact 36. Thus, if contact 36 fails to open in response to first relay 34 receiving a suitable first control signal from channel A processor 32, channel A processor 32 signals the other control input of second relay 40 with a suitable third control signal to open contact 42. Similarly, the cross connection of channel B processor 38 to another control input of first relay 34 enables channel B processor 38 to open contact 36 if channel B processor 38 detects signal T1 after signaling second relay 40 to open contact 42. Thus, if contact 42 fails to open in response to second relay 40 receiving the second control signal from channel B processor 38, channel B processor 38 signals the other control input of first relay 34 with a suitable fourth control signal to open contact 36.

Preferably, the first control signal from channel A processor 32 and the fourth control signal from channel B processor 38 provide power and ground, respectively, to a coil 44 which controls the state of contact 36 of first relay 34. Hence, by selectively controlling the application of power and ground to coil 44, channel A processor 32 and channel B processor 38 can control the state of contact 36. Similarly, the third control signal from channel A processor 32 and the second control signal from channel B processor 38 preferably provide power and ground, respectively, to a coil 46 which controls the state of contact 42 of second relay 40. Thus, by selectively controlling the application of power and ground to coil 46, channel A processor 32 and channel B processor 38 can control the state of contact 42.

Preferably, first relay 34 and second relay 40 each have a status output connected for supplying to channel A processor 32 and channel B processor 38 an indication of the state of contacts 36 and 42, respectively. In operation, channel A processor 32 monitors via the status output of first relay 34 the state of contact 36. If contact 36 did not open in response to channel A processor 32 signaling first relay 34 to open contact 36, channel A processor 32 can signal second relay 40 to open contact 42. Similarly, channel B processor 38 monitors the status output of second relay 40. If contact 42 did not open in response to channel B processor 38 signaling second relay 40 to open contact 42, channel B processor 38 can signal first relay 34 to open contact 36.

As shown in FIGS. 2a–2b, first relay 34 and second relay 40 can each have another status output connected to channel B processor 38 and channel A processor 32, respectively. These status outputs can be utilized to supply to channel B processor 38 and channel A processor 32 an indication of the state of contacts 36 and 42 of first relay 34 and second relay 40, respectively.

As can be seen from the foregoing, the present invention provides a brake feedback monitor for monitoring the difference between the electric brake effort request of an electric motor of a vehicle and the actual electrical braking effort of the motor in a blended electrical friction braking system and for causing the friction brake of the vehicle to assume the entire braking effort of a vehicle if the difference exceeds a predetermined difference.

The invention has been described with reference to the preferred embodiment. Obvious modifications and alterations will occur to others upon reading and understanding the preceding detailed description. For example, channel A processor 32 and channel B processor 38 can utilize different criteria and/or algorithms to determine the difference between signal T1 and signal T2. Hence, each processor 32 and 38 can have a different sensitivity to the differences between signal T1 and signal T2. It is intended that the invention be construed as including all such modifications and alterations insofar as they come within the scope of the appended claims or the equivalents thereof.

We claim:

1. A blended electrical/friction braking system for use in a vehicle having an electric motor which can be operated to electrically brake one or more wheels of the vehicle and a friction brake for friction braking one or more wheels of the vehicle, the braking system comprising:

a brake controller for monitoring a brake effort request and for allotting the brake effort request between a first brake effort request corresponding to a desired amount of electrical braking effort to be supplied by the electric motor during electrical braking and a second brake effort request corresponding to a desired amount of friction braking effort to be supplied by the friction brake;

a drive control unit for producing from the first brake effort request a first signal corresponding thereto and for supplying the first signal to the brake controller;

at least one sensor for sensing at least one electrical condition of the electric motor during electric braking; and a brake feedback monitor for monitoring the first signal, for converting the at least one sensed electrical condition into a second signal corresponding thereto, for comparing the first signal and the second signal and for terminating receipt of the first signal by the brake controller in response to a difference between the first signal and the second signal exceeding a predetermined difference, wherein the brake controller responds to the termination of the first signal thereat by allotting the incoming brake effort request entirely to the second brake effort request.

2. The braking system as set forth in claim 1, wherein the at least one sensed electrical condition includes voltage, current or the phase angle therebetween.

3. The braking system as set forth in claim 1, wherein:

the brake feedback monitor includes a processor and a relay connected to the processor to be controlled thereby;

the relay has a contact in a path of the first signal between the drive control unit and the brake controller; and the processor controls the contact so that (i) the brake controller receives the first signal when the difference between the first signal and the second signal does not exceed the predetermined difference and (ii) the brake controller does not receive the first signal when the difference between the first signal and the second signal exceeds the predetermined difference.

4. The braking system as set forth in claim 1, wherein:

the brake feedback monitor includes a pair of relays connected in series in a path of the first signal between the drive control unit and the brake controller and a pair of processors each connected to control the contacts of the pair of relays and connected to sense the first signal on the path between the pair of relays and the brake controller;

one processor determines the second signal from the at least one sensed electrical condition and supplies the second signal to the other processor;

each processor determines whether the difference between the first signal and the second signal exceeds the predetermined difference; and in response to determining the difference exceeds the predetermined difference, each processor signals one relay to change state thereby terminating receipt of the first signal by the brake controller.

5. The braking system as set forth in claim 4, wherein each relay includes a status output connected to one of the processors for supplying thereto an indication of the state of the contact of the relay.

6. The braking system as set forth in claim 5, wherein each processor signals the other relay to change state if the status output of the one relay does not indicate that the one relay is in a state that terminates receipt of the first signal by the brake controller.

7. The braking system as set forth in claim 4, wherein each processor, in response to detecting the first signal after signaling the one relay to change state, signals the other relay to change state.

8. The braking system as set forth in claim 1, wherein the first or second signal is a pulse width modulated signal.

9. A method of braking an electrical motor powered vehicle comprising the steps of:

(a) allotting a brake effort request between an electric brake effort request and a friction brake effort request;

(b) converting the electric brake effort request into a first signal;

(c) monitoring the first signal;

(d) monitoring one or more electrical conditions of the electric motor in response to the electric brake effort request;

(e) selectively opening and closing a feedback path for the first signal as a function of the first signal and the one or more electrical conditions; and (f) in response to opening the feedback path, allotting the brake effort request entirely to the friction brake effort request.

10. The method as set forth in claim 9, wherein step (c) includes the steps of:

providing a pair of relays, each relay having a contact disposed in series with the feedback path;

signaling one relay to open its contact as a function of the first signal and the one or more electrical conditions; and after signaling the one relay to open its contact and in response to detecting the presence of the first signal downstream in the feedback path from the one relay, signaling the other relay to open its contact.

11. The method as set forth in claim 9, wherein step (e) includes the steps of:

providing a pair of relays, each relay having a contact disposed in series with the feedback path and a status output which provides a status of the state of the contact thereof;

signaling one relay to open its contact as a function of the first signal and the one or more electrical conditions; and after signaling the one relay to open its contact and in response to detecting from the status output of the one relay that its contact is closed, signaling the other relay to open its contact.

12. The method as set forth in claim 9, further including the steps of:

converting the one or more electrical conditions to a second signal;

determining a difference between the first signal and the second signal; and closing the feedback path when the difference does not exceed a predetermined difference and opening the feedback path when the difference exceeds the predetermined difference.

* * * * *